United States Patent
Hünlich

(10) Patent No.: US 6,940,858 B1
(45) Date of Patent: Sep. 6, 2005

(54) METHOD FOR ESTABLISHING A ROUTE VIA A COMMUNICATIONS NETWORK

(75) Inventor: Klaus Hünlich, Neuching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/720,961
(22) PCT Filed: Jul. 1, 1999
(86) PCT No.: PCT/DE99/01953
§ 371 (c)(1), (2), (4) Date: Jan. 3, 2001
(87) PCT Pub. No.: WO00/02412
PCT Pub. Date: Jan. 13, 2000

(30) Foreign Application Priority Data

Jul. 3, 1998 (DE) .......................... 198 29 821

(51) Int. Cl.⁷ ............................................. H04L 12/28
(52) U.S. Cl. .................... 370/392; 370/352; 370/354; 370/355; 370/356; 370/357; 370/389; 370/395.1; 370/395.31; 370/400
(58) Field of Search ............................... 370/392, 352, 370/354, 355, 356, 357, 389, 395.1, 395.31, 400

(56) References Cited

U.S. PATENT DOCUMENTS

| | | | | |
|---|---|---|---|---|
| 5,506,847 A | * | 4/1996 | Shobatake | 370/338 |
| 5,790,546 A | * | 8/1998 | Dobbins et al. | 370/400 |
| 5,835,710 A | * | 11/1998 | Nagami et al. | 709/250 |
| 5,996,021 A | * | 11/1999 | Civanlar et al. | 709/238 |
| 6,115,372 A | * | 9/2000 | Dinha | 370/352 |

FOREIGN PATENT DOCUMENTS

| | | |
|---|---|---|
| DE | 39 04 403 A1 | 8/1989 |
| DE | 689 17 580 T2 | 7/1990 |
| EP | 0 406 842 A2 | 1/1991 |

OTHER PUBLICATIONS

Händel et al., "ATM Networks Concepts, Protocols, Applications", Addison–Wesley, pp. 182–189.
McDonald et al., "ARP Versus ES–IS: Performance Evaluation of Neighbour–Greeting Protocols", The Computer Journal, XP–000729298, pp. 854–867.
Garcia–Luna–Aceves, "Libra: A Distributed Routing Algorithm for Large Internets", XP000390448, pp. 1465–1471.
Bakker et al., "Prefix routing schemes in dynamic networks", Computer Networks and ISDN Systems, pp. 403–421.

* cited by examiner

Primary Examiner—Wellington Chin
Assistant Examiner—Kevin Mew
(74) Attorney, Agent, or Firm—Staas & Halsey LLP

(57) ABSTRACT

Proceeding from a source terminal device a connection setup message is communicated to a network node of the communication network A network node receiving the connection setup message enters the network node address allocated to it in the communication network and forwards the connection setup message to at least one neighboring network node. Upon reception of the connection setup message at a destination terminal device, a confirmation message is returned to the source terminal device on the identified route, whereby a switching information for a following message transmission is stored in the network nodes that have been traversed.

18 Claims, 4 Drawing Sheets

METHOD FOR ESTABLISHING A ROUTE VIA A COMMUNICATIONS NETWORK

BACKGROUND OF THE INVENTION

1. Field of the Invention

The present invention is directed to a method for establishing a route via a communication network comprising a plurality of network nodes connected to one another.

2. Description of the Related Art

In communication networks, a distinction is made between connectionless and connection-oriented communication networks dependent on the topology of the communication networks. In connectionless communication networks, a signalling phase preceding a message transmission between comm terminal devices allocated to the communication network is omitted, a communication connection between the communication terminal devices being set up in the framework of said signalling phase. In the framework of the signalling phase, a layer-3 connection (switching layer) is established according to the OSI reference model (Open Systems Interconnection), i.e. the communication connection between the communication terminal devices is established by section-by-section linking of individual layer-2 connections (security layer) according to the OSI reference model—also frequently referred to as point-to-point connection in the literature.

Connectionless communication networks are, for example, local networks—often abbreviated as LAN (Local Area Network) in the literature—with a ring or bus architecture. In a connectionless communication network, a message package to be transmitted is transmitted to each communication terminal device allocated to the communication network. The decision as to which communication terminal device further-processes or, discards the received message packet is made by the recipient the he message packet.

Similarly, communication services wherein a message transmission ensues without setup of a point-to-point communication connection established in the framework of a signalling phase are referred to as connectionless services. Such connectionless services, however, can only be realized within local networks (LANs) with corresponding network topology.

In the framework of a message communication between two communication terminal devices allocated to different comm networks, the lack of signalling must be compensated by corresponding measures given a network interworking. This compensation ensues with what are referred to as routers, with which a linking of communication networks with different network topology is realized.

With respect to its critical function, a router realizes the layer 3 (switching layer) of the OSI reference model, whereby networks with different topology of the layers 1 (bit transmission layer) and 2 (security layer) are physically connected with the assistance of a router. In order to switch message packets between the networks connected to a router, the address particulars contained in routing information of the message packets—particularly a destination and a source address—are interpreted and evaluated by a control means located in the router. As such the router evaluates the layer-3 addresses contained in a message packet to be transmitted and converts these into corresponding layer-2 addresses. The layer-2 connections (i.e. the connections to be respectively established between two network nodes arranged in a network) required for a layer-3 connection (i.e. for the terminal device connection between the communication terminal devices) are established on the basis of these layer-2 addresses. Subsequently, the message packets are converted protocol-suited for a transmission and are transmitted via the layer-2 connections that have been established.

In the framework of a message transmission via an ATM-based communication network (Asynchronous Transfer Mode), a signalling phase preceding the message transmission between is required for setting up a communication connection between two communication terminal devices, i.e. an ATM-based communication network is a connection-oriented communication network.

Before the beginning of the message transmission, connection tables with switching information composed of a virtual channel identification and of a virtual path identification are established in the pertinent ATM network node in an ATM-based communication network. In the connection tables, a VCI value is allocated to the virtual channel identification and a VPI value is allocated to the virtual path identification. The switching information entered in the connection tables define how the virtual paths—or, virtual transmission channels contained in the virtual paths—of the incoming and outgoing connections at an ATM network node are allocated to one another by the signalling, i.e. which input is connected to which output in switching-oriented terms.

For example, European Published Application EP 0 406 842 A2 discloses a communication network based on the asynchronous transfer mode, whereby switching information in the framework of a signalling phase are entered in the traversed network nodes of the communication network with a connection setup message communicated from a source to a destination communication terminal device and a confirmation message subsequently communicated from the destination to the source communication terminal device.

In the cell-based data transmission method known as asynchronous transfer mode (ATM), data packets of a fixed length, what are referred to as ATM cells, are used for the data transport. An ATM cell is composed of a five byte long cell header—what is referred to as the header—containing switching data relevant for the transport of an ATM cell and of a 48 byte long payload cell, what is referred to as the payload. ATM cells transmitted via the virtual connections essentially comprise switching data composed of a VPI value and a VCI value in the cell header. The data deposited in the header are processed at the input of an ATM network node, i.e. the switching data arranged therein are acquired and interpreted. Subsequently, the ATM cells are switched to an output representing a specific destination on the basis of the switching information stored in the connection table, being switched thereto by a switching network module arranged in the ATM network node.

In order to be able to emulate connectionless services in an ATM-based communication network, a conversion of the switching data deposited in the cell header of a communicated ATM cell must ensue in every ATM network node arranged in the ATM-based communication network, so that the required switching capacity or, calculating performance increases greatly in an ATM network node. Given an increased data volume, this can lead to a communication delay—often referred to as "delay" in the literature—, so that, for example, connectionless services cannot be utilized within the scope of applications having real-time demands.

In order to reduce the required calculating outlay in an ATM network node, "ATM networks—concepts, protocols, applications", Addison-Wesley, 3$^{rd}$ edition, 1998, ISBN 0-201-17817-6 discloses that connectionless services be realized via specific, what are referred to as "CL servers" (Connection Less Server). These CL servers are connected to one another and undertake the address conversions needed for an emulation of connectionless services in an ATM-base communication network analogous to the methods that are implemented in routers. Given the methods employed here, however, a processing or, communication delay can also arise given an elevated data volume.

SUMMARY OF THE INVENTION

The present invention is based on the object of specifying a method wherein the processing or, communication delay is reduced in an emulation of connectionless services via a connection-oriented communication network.

This object is inventively achieved by communicating a connection setup message that includes a destination address and a source address to a network node. The network node enters its address into the connection setup message. The connection setup message is then forwarded via the network node that receives the connection set up message to a neighboring network node. Upon reception of the connection set up message at a destination node the connection setup message is forwarded to a destination communication terminal device. A confirmation message is then returned to the source communication terminal device and switching information for messages to be subsequently transmitted between the source communication terminal and the destination communication terminal device are deposited in network nodes that are traversed.

A critical advantage of the invention is that, in contrast to the prior art wherein switching information for all network nodes arranged in the communication network are stored in a network node in the present invention, only those switching information are stored in the network nodes of the communication network that are required for the connections currently conducted over the network node. This leads to a considerable reduction of the memory capacity required in the network node.

Another advantage of the invention is that, given the present method for route determination and in contrast to the signaling in a connection-oriented communication network, no transmission conditions such as, for example, a declaration about the required transmission capacity or about real-time demands are made, so that a route determination and a subsequent message communication can be realized faster.

In another embodiment of the of the invention wherein a connection setup message or, a confirmation message is not forwarded up to the originating or, destination communication terminal device participating in a connection but is processed in the network node allocated to the originating or, destination communication terminal device. This has the advantage that the source or, the destination communication terminal device can be kept free of routing jobs.

One other advantage of developments of the invention is that a decision about the selection of a route between a source communication terminal device and a destination communication terminal device can be made by the subscriber at the destination communication terminal device, so that the criteria for a connection setup relevant to said subscriber such as, for example, the transmission time, the costs or the transmission capacity made available on the identified route take effect.

As a result of a deletion of switching information stored in a network node after expiration of a prescribable time span (for example, after 10 minutes) wherein no messages allocated to these switching information were communicated, assures that only the currently acquired switching information are stored in a network node.

DETAILED DESCRIPTION OF THE PREFERRED EMBODIMENTS

Figure 1:
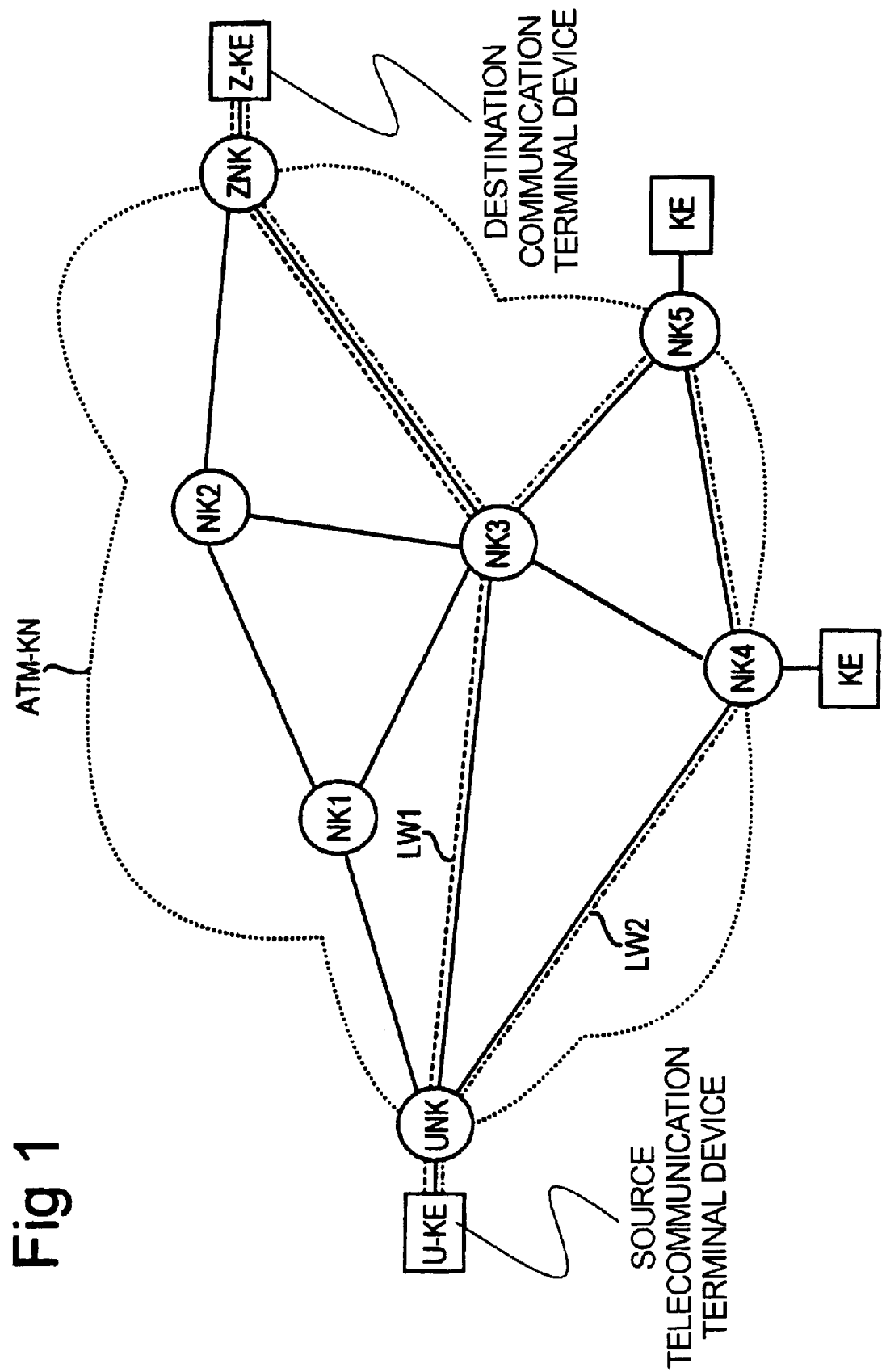
FIG. 1 shows a structogram directed to the schematic illustration of an ATM-based communication network with network nodes arranged therein.

FIG 1. shows a schematic illustration of an ATM-based communication network ATM-KN having network nodes NK arranged therein and connected to one another. FIG. 1 shows five network nodes, NK1 through NK5. The network nodes NK are realized, for example, by ATM switching systems to which communication terminal devices can be connected. By way of example, two communication terminal devices KE are shown that are connected via a fourth network node NK4 or, respectively, via a fifth network node NK5 to the ATM-based communication network ATM-KN.

Further, a source communication terminal device U-KE is connected to the ATM-based communication network ATM-KS via a network node NK—referred to as source network node UNK below—and a destination communication terminal device Z-KE is connected to the ATM-based communication network ATM-KN via a further network node NK—referred to below as destination network node ZNK.

Proceeding from the source communication terminal device U-KE, a message is to be communicated to the destination communication terminal devices Z-KE via the ATM-based communication network ATM-KN.

To this end, a connection setup message R is communicate d from the source communication terminal device U-KE to the source network node UNK for a determination of a route from the source communication terminal device U-KE to the destination communication device Z-KE. The individual network nodes NK are connected to one another via a specific connection for the communication of connection setup messages are to a neighboring network node NK. For example, a specific transmission channel—frequently abbreviated in the literature as VC (Virtual Channel)—is reserved for the communication of connection setup messages R. A connection setup message R can be communicated to the destination communication terminal devices ZK-E from the source communication terminal device U-KE via various routes LW. For example, a first route LW1 and a second route LW2 are shown with broken lines in the Figure.

Figure 2:
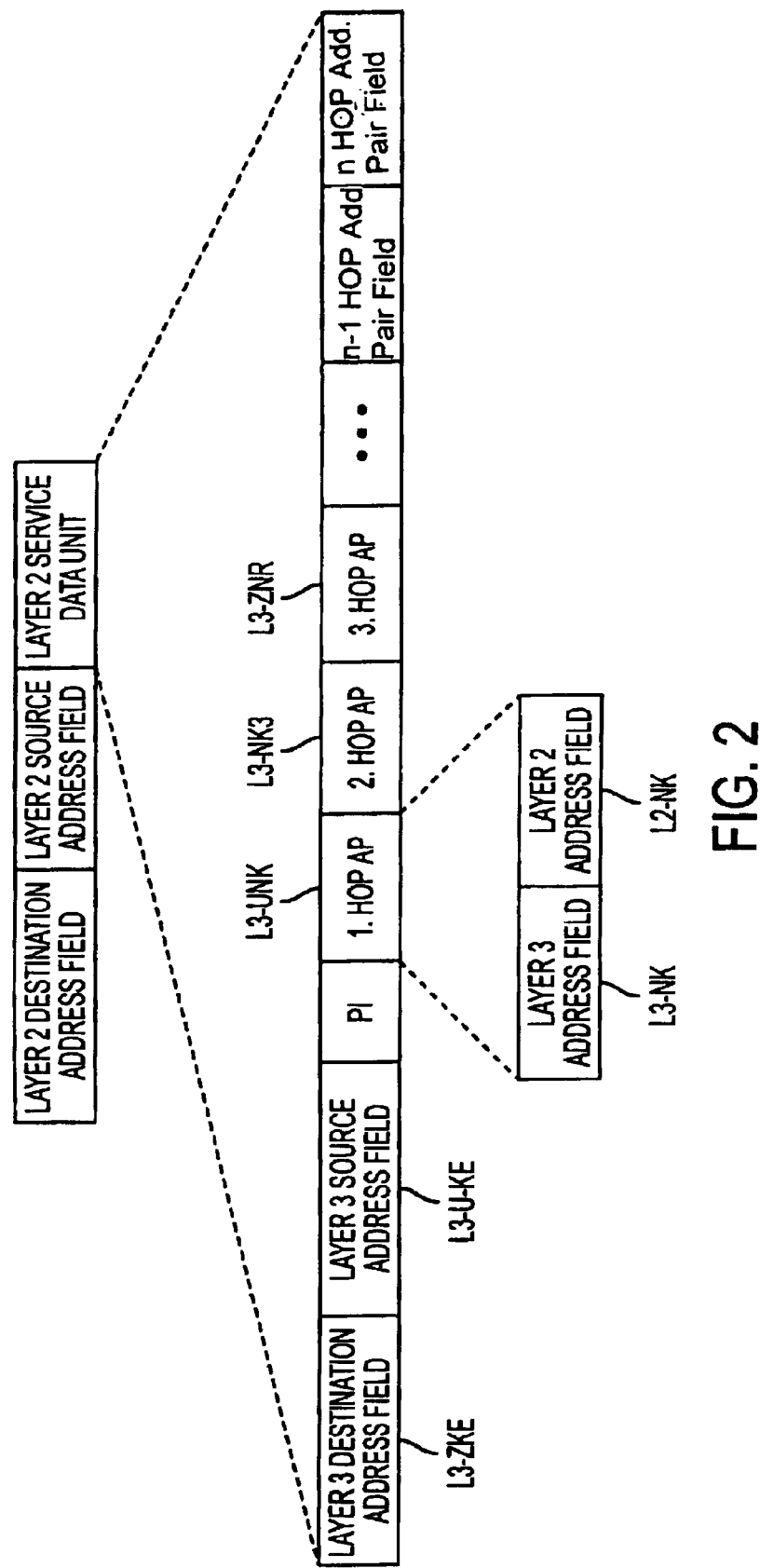
FIG. 2 shows a structogram directed to the schematic illustration of a connection setup message or, respectively, a confirmation message.

FIG. 2 shows a schematic illustration of a connection setup message R (Request) or, of a confirmation message E (Established). The connection setup message R or, the confirmation message E is composed of a layer-2 destination address field L2-DA (Layer 2—Destination Address), of a layer-2 source address field L2-SA (Layer 2—Source Address) and of a service data field L2-SDU (Layer 2—Service Data Unit). In the present example, the layer-2 destination address field L2-DA contains the layer-2 address L2-Z-KE according to the OSI reference model of the destination communication terminal device Z-KE and the layer-2 source address field L2-SA contains the layer-2 address L2-U-KE according to the OSI reference model of the source communication terminal device U-KE.

The service data field L2-SDU is subdivided into a layer-3 destination address field L3-DA, into a layer-3 source address field L3-SA, into a protocol info-field PI and into n address pair fields 1.HOP AP, . . . ,n.HOP AP. In the present example, the layer-3 destination address field L3-DA contains the layer-3 address L3Z-KE according to the OSI reference model of the destination communication terminal device Z-KE, and the layer-3 source address field L3-SA contains the layer-3 address L3-U-KE according to the OSI reference model of the source communication terminal device U-KE.

The protocol info-field PI serves to distinguish between connection setup message R and confirmation message E and alternatively contains an "R" or an "E" as entry. When the protocol info-field PI exhibits an "R" as entry, then it is a matter of a connection setup message R. When the protocol info-field PI exhibits an "E" as entry, then it is a matter of a confirmation message B.

The address pair fields 1.HOP AP, . . . ,n.HOP AP are respectively subdivided into a layer-3 address field L3-AF and into a layer-2 address field L2-AF. The layer-3 address is L3-NK are stored in the address field pairs 1.HOP AP, . . . ,n.HOP AP in the layer-3 address field L3-AF and the layer-2 addresses L2-NK of the network nodes NK traversed on a route LW are stored therein in the layer-2 address field L2-AF.

A connection setup message R communicated via the first route LW1 from the source communication terminal device U-KE to the destination communication terminal device Z-KE contains three valid address pair fields 1.HOP AP, . . . ,3.HOP AP. The first address pair field 1.HOP AP contains the layer-3 address L3-UNK of the source network node UNK. The second address pair field 2.HOP AP contains the slice-3 address L3-NK3 of the third network node NK3. The third address pair field 3.HOP AP contains the layer-3 address L3-ZNK of the destination network node ZNK.

A connection setup message R communicated via the second route LW2 from the source communication terminal device U-KE to the destination communication terminal device Z-KE contains five valid address pair fields 1.HOP AP, . . . ,5.HOP AP. The first address pair field 1.HOP AP contains the layer-3 address L3-UNK of the source network node UNK. The second, third and fourth address pair field 2.HOP AP, 3.HOP AP, 4.HOP AP contain the layer-3 addresses L3-NK4, L35 NKS, L3-NK3 of the fourth, fifth and third network node NK4, NK5, NK3. The fifth address pair field 5.HOP AP contains the layer-3 address L3-ZNK of the destination network node ZNK.

Figure 3:
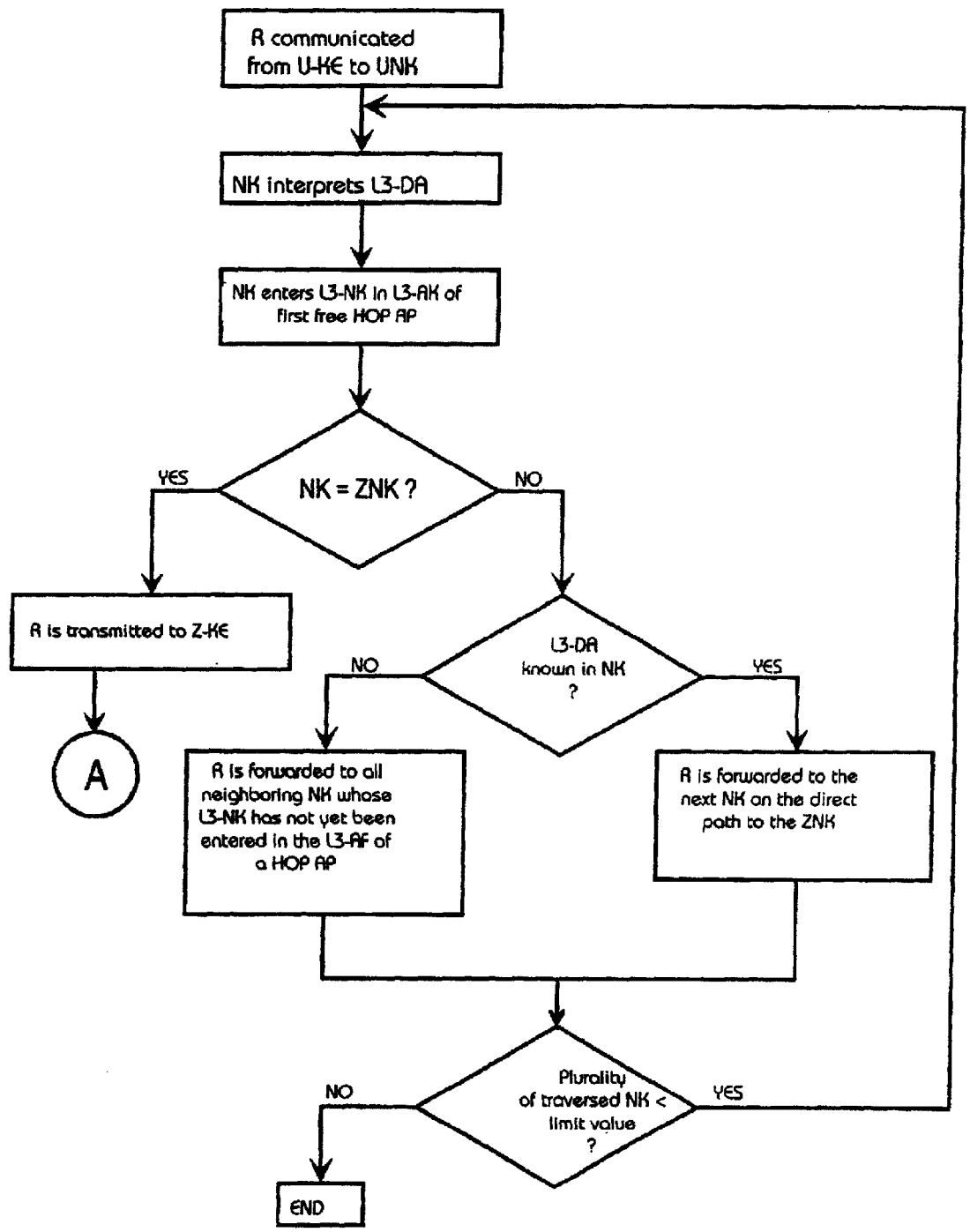
FIG. 3 shows a flow chart for illustrating the method steps sequencing in a communication of a connection setup message from a source communication terminal device to a destination communication terminal device.

FIG. 3 shows a flow chart for illustrating the method steps sequencing in a communication of a connection setup message R from the source communication terminal device U-KE to the destination communication terminal device Z-NKE.

When, proceeding from the source communication terminal device U-KE, a message is to be communicated to the destination communication terminal device Z-KE, then the source communication terminal device U-KE sends a connection setup message R to the source network node UNK via the pre-defined transmission channel. The network node NK receiving a connection setup message R interprets the destination address L3-Z-KE of the destination communication terminal device Z-KE deposited in the layer-3 destination address field L3-DA and enters the layer-3 address L3-NK allocated to it in the ATM-based communication network ATM-KN in the layer-3 address field L3-AF of the first free address pair field 1.HOP AP, . . . n.HOP AP. When the network node NK is the source network node UNK, then the source network node UNK enters the layer-3 address L3-UNK in the layer-3 address field L3-AF of the first address pair field 1 .HOP AP.

In a next step, a check is carried out to see whether the network node NK that has received a connection setup message R, is the destination network node ZNK. When this is the case, the connection setup message R is communicated directly to the destination communication terminal device Z-KE via the pre-defined transmission channel. The method steps sequencing in this case are explained in greater detail with reference to FIG. 4. When the network node NK is not the destination network node ZNK, then a check is carried out to see whether the destination address L3-Z-KE of the destination communication terminal device Z-KE deposited in the layer-3 destination address field L3-DA is known in the network node NK. When this is the case, then the connection setup message R is forwarded via the pre-defined transmission channel to the next network node NK lying on the direct route to the destination network node ZNK.

When the destination address L3-Z-KE is not known in the network node NK, then the connection setup message R is forwarded via the pre-defined transmission channels to all neighboring network nodes NK whose layer-3 addresses L3-NK are not entered in a layer-3 address field L3-AF of an address pair field 1.HOP AP, . . . , n.HOP AP. This measure prevents loop formations from occurring in the determination of a route LW.

Before a transmission of the connection setup message R to a further network node NK, the plurality of network nodes NK previously traversed by the connection setup message R is determined, i.e. the plurality of entries in a layer-3 address field L3-AF of the address pair field s 1.HOP AP, . . . ,n.HOP AP. When the plurality has reached an adjustable limit value, then the connection setup message R is discarded. This measure assures that the transmission resources made available by the ATM-based communication network ATM-KN are not unnecessarily occupied in the determination of a route LW.

Figure 4:
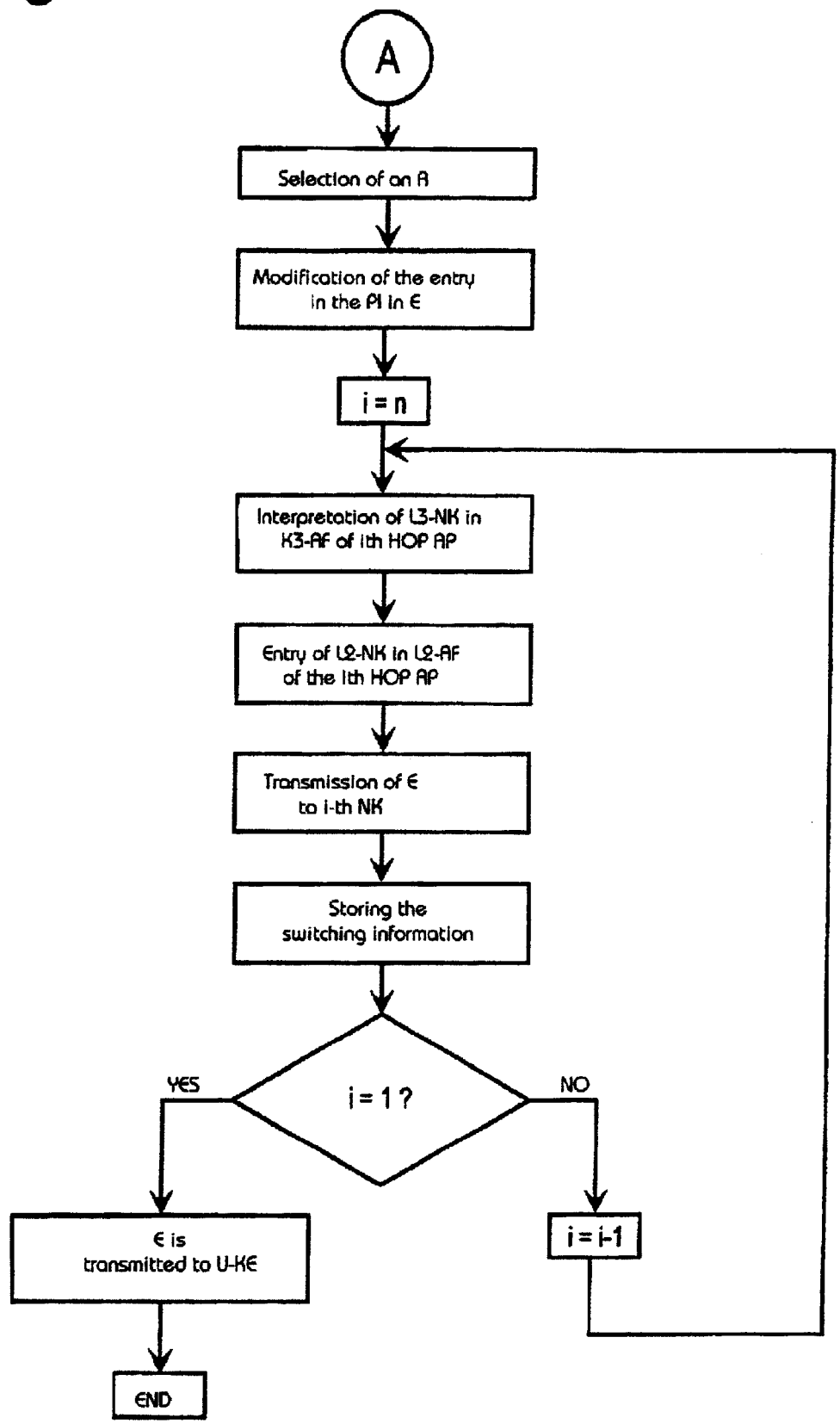
FIG. 4 shows a flow chart for illustrating the method steps sequencing given a communication of a confirmation message from the destination communication terminal device to the source communication terminal device.

FIG. 4 shows a flow chart for illustrating the method steps sequencing given a transmission of a confirmation message E from the destination communication terminal device Z-KE to the source communication terminal device U-KE. When the destination communication terminal Z-KE has received a plurality of connection setup messages R within a prescribable time span, a connection setup message R is selected according to prescribable criteria. For example, the transmission duration of a connection setup message R, the number of network nodes NK traversed on the route LW defined by the connection setup message R, the costs incurred due to the route LW or the transmission capacity made available on the route LW are selected as criteria for the selection for a connection setup message R. Alternatively, combinations of these criteria can also be utilized for the selection of a connection setup message R.

After the selection of a connection setup message R, the other connection setup messages R are discarded and the selected connection setup message R is converted into a confirmation message E by modifying the entry in the protocol infofield PR from "R" to "E".

In a next step, the layer-3 address L3-NK is interpreted in the layer-3 address field L3-AF of the n.address pair field n.HOP AP, and the layer-2 address L2-NK of the network node NK referenced by this address is entered in the layer-2 address field L2-AF of the n.address pair field n.HOP AP. In this case, the network node NK is the destination network node ZNK. Subsequently, the confirmation message E, proceeding from the destination communication terminal device Z-KE via the pre-defined transmission channel, is communicated to the network node NK—the destination network node ZNK in this case—referenced by the layer-3 address L3-NK deposited in the layer-3 address field L3-AF of the n.address pair field n.HOP AP. A switching information is stored in the network node NK for a following message communication between the source communication terminal device UK-KE and the destination communication terminal device Z-KE. This switching information composed of an input VCI value and an output VCI value indicates which input channel is connected to which output channel of the network node in switching-oriented terms.

When the network node NK is a matter of the source network UNK, i.e. when n=1, then the confirmation message is forwarded via the predefined transmission channel directly to the source communication terminal device U-KE.

When the network node NK is not the source network node UNK, the layer-3 address L3-NK in the layer-3 address field L3-AF of the n-first address pair field n-1.HOP AP is interpreted in a next step, and the slice-2 address L2-NK of the network node NK referenced by this address is entered in the layer-2 address field L2-AF of the n-1.address pair field n-1.HOP AP. Subsequently, the confirmation message E is communicated via the predefined transmission channel to the network node NK referenced by the layer-3 address L3-NK deposited in the layer-3 address field L3-AF of the n-1 address pair field n-1.HOP AP, and the switching information needed for a subsequent message communication between the source communication terminal device U-KE and the destination communication terminal device Z-KE and composed of input VCI value and output VCI value is stored.

These method steps are repeated until the confirmation message E reaches the source network node UNK, proceeding from which it is communicated via the predefined transmission channel to the source communication terminal device U-KE.

When, given the present exemplary embodiment, for example, the plurality n of network nodes NK traversed on a route LW forms the basis as criterion for a selection of a connection setup message R at the destination communication terminal equipment Z-KE, then the connection setup message R representing the first route LW1 is selected and converted into a confirmation message E. The connection setup message R representing the second route LW2 is discarded.

The layer-3 address L3-ZNK in the layer-3 address field L3-AF of the third address pair field 3.HOP AP is interpreted in the destination communication terminal device Z-KE, and the layer-2 address L2-ZNK of the destination network node ZNK indicated by the layer-3 address L3-ZNK is entered in the layer-2 address field L2-AF of the third address pair field 3.HOP AP. Subsequently, the confirmation message E is communicated proceeding from the destination communication terminal device ZKE via the predefined transmission channel to the destination network node ZNK. The switching information composed of input VCI value and output VIC value that is relevant for a subsequent message transmission is stored in the destination network node. In a next step, the layer-3 address L3-NK3 in the layer-3 address field N3-AF of the second address pair field 2.HOP AP is interpreted, and the layer-2 address L2-NK3 of the third network node NK3 referenced by the layer-3 address L3-NK3 is entered in the layer-2 address field L2-AF of the second address pair field 2.HOP AP. Subsequently, the confirmation message E is communicated to the third network node NK3 via the predefined transmission channel proceeding from the destination network node Z-NK, the switching information relevant for a subsequent message communication being stored in said third network node NK3. In a further step, the layer-3 address L3-UNK in the layer-3 address field L3-AF of the first address pair field 1.HOP AP is interpreted, and the layer-2 address L2-UNK of the source network node UNK referenced by the layer-3 address L3-UNK is entered in the layer-2 address field L2-AF of the first address pair field 1.HOP AP. Subsequently, the confirmation message E is communicated to the source network node NK3 via the predefined transmission channel proceeding from the third network node NK3, the switching information relevant for a subsequent message communication being stored in said source network node NK3. In a final step, the confirmation message E is communicated via the predefined transmission channel to the source communication terminal device U-KE.

When no messages are communicated via the connection between the source communication terminal device U-KE and the destination communication terminal device Z-KE allocated to the switching information stored in a network node NK within an adjustable time span, for example with a time span of 10 minutes, then this switching information is deleted. It is thus assured that the switching information stored in a network node NK are constantly updated.

In contrast to the traditional signaling in an ATM-based communication network ATM-KN, wherein switching information for a message transmission to a further network node NK arranged in the ATM-based communication network ATM-KN must be stored in every switching node NK, only those switching information that are required for the connections currently conducted across the network node NK are stored in a network node NK given the disclosed method for route determination.

This leads to a considerable reduction of the required address memory capacity in the network node NK and to an increase in the switching speed.

In contrast to the traditional signaling or in the route LW between the source communication terminal device U-KE and the destination communication terminal device Z-KE is predetermined by switching information stored in the source network node UNK, further, a selection of a route LW between the source communication terminal device U-KE and the destination communication terminal device Z-KE is undertaken by the subscriber at the destination communication terminal device Z-KE. Thus, criteria for a connection setup such as, for example, the transmission time, the costs incurred by a route LW or the transmission capacity made available on a route LW that are relevant for the subscriber can thus be taken into consideration situation-condition.

In the present method for route determination and in contras to the traditional signaling in an ATM-based communication network ATM-KN, no transmission conditions such as, for example, a decoration about the transmission capacity required or about real-time demands are made. As a result thereof, a route determination and a subsequent message transmission between the source communication terminal device U-KE and the destination communication terminal device Z-KE can be realized faster. The communication of a connection setup message R or, of a confirmation message E in the ATM-based communication network ATM-KN ensues with the available transmission bit rate—frequently abbreviated as ABR (Available Bitrate) in the literature. As a result of the inventive method, thus, only processing delay or, transmission delayed as in the scope of connection-oriented services arise given an emulation of connectionless services via the ATM-based communication network ATM-KN.

Although other modifications and changes may be suggested by those skilled in the art, it is the intention of the inventors to embody within the patent warranted hereon all changes and modifications as reasonably and properly come within the scope of their contribution to the art.

I claim:

1. A method for establishing a route via a connection-oriented communication network with a plurality of network nodes connected to one another for emulating connectionless services, comprising the steps of:

communicating a connection setup message including a destination address and a source address to a network node, said connection setup message proceeding from a source communication terminal device;

entering a network address into the connection setup message via said network node, said network address being allocated to the network node in the communication network;

forwarding the connection setup message via the network node that receives the connection setup message to at least one neighboring network node;

forwarding the connection setup message to a destination communication terminal device upon reception of the connection setup message at a destination node, said destination node being identifiable with an assistance of the destination address; and returning a confirmation message to the source communication terminal device on said route, said route being defined by the source address, said route also being defined by the network node address, a switching information for messages to be subsequently transmitted between the source communication terminal and the destination communication terminal device being deposited in network nodes that are traversed, wherein the network node receiving the connection setup message forwards the connection setup message to one or more other network nodes only if the only one or more other network nodes each has a network node address not entered in the received connection setup message, the one or more other network nodes being connected to the network node receiving the connection setup message.

2. A method for establishing a route via a connection-oriented communication network with a plurality of network nodes connected to one another for emulating connectionless services, comprising the steps of:

communicating a connection setup message including a destination address and a source address to a network node, said connection setup message proceeding from a source communication terminal device;

entering a network address into the connection setup message via said network node, said network address being allocated to the network node in the communication network;

forwarding the connection setup message via the network node that receives the connection setup message to at least one neighboring network node; and returning a confirmation message to the source communication terminal device on said route upon receiving of the connection setup message at a destination node, said destination node identifiable with an assistance of the destination address, said route being defined by the source address, said route also being defined by the network node address, a switching information for messages to be subsequently transmitted between the source communication terminal and the destination communication terminal device being deposited in network nodes that are traversed, wherein the network node receiving the connection setup message forwards the connection setup message to one or more other network nodes only if the only one or more other network nodes each has a network node address not entered in the received connection setup message, the one or more other network nodes being connected to the network node receiving the connection setup message.

3. A method for establishing a route via a connection-oriented communication network with a plurality of network nodes connected to one another for emulating connectionless services, comprising the steps of:

communicating a connection setup message including a destination address and a source address to a network node, said connection setup message proceeding from a source communication terminal device;

entering a network address into the connection setup message via said network node, said network address being allocated to the network node in the communication network;

forwarding the connection setup message via the network node that receives the connection setup message to at least one neighboring network node;

forwarding the connection setup message to a destination communication terminal device upon reception of the connection setup message at a destination node, said destination node being identifiable with an assistance of the destination address; and returning a confirmation message to a source network node to which the source communication terminal device is allocated on said route, said route being defined by the source address, said route also being defined by the network node address, a switching information for messages to be subsequently transmitted between the source communication terminal and the destination communication terminal device being deposited in network nodes that are traversed, wherein the network node receiving the connection setup message forwards the connection setup message to one or more other network nodes only if the only one or more other network nodes each has a network node address not entered in the received connection setup message, the one or more other network nodes being connected to the network node receiving the connection setup message.

4. A method for establishing a route via a connection-oriented communication network with a plurality of network nodes connected to one another for emulating connectionless services, comprising the steps of:

communicating a connection setup message including a destination address and a source address to a network node, said connection setup message proceeding from a source communication terminal device;

entering a network address into the connection setup message via said network node, said network address being allocated to the network node in the communication network;

forwarding the connection setup message via the network node that receives the connection setup message to at least one neighboring network node; and returning a confirmation message to a source network node on said route upon receiving of the connection setup message at a destination node, said destination node identifiable with an assistance of the destination address, said route being defined by the source address, said mute also being defined by the network node address, said source communication terminal device being allocated to said source network node, a switching information for messages to be subsequently transmitted between the source communication terminal and the destination communication terminal device being deposited in network nodes that are traversed, wherein the network node receiving the connection setup message forwards the connection setup message to one or more other network nodes only if the only one or more other network nodes each has network node address not entered in the received connection setup message, the one or more other network nodes being connected to the network node receiving the connection setup message.

5. A method according to claim 1, further comprising the step of: communicating the connection setup message to a source network node, said source communication terminal device being connected to the communication network via said source network node.

6. A method according to claim 1, wherein said network node receiving the connection setup message forwards the connection setup message to network nodes being connected to the network node receiving the connection only when a plurality of network nodes traversed by a received connection setup message is lower than an adjustable limit value.

7. A method according to claim 1, wherein in instances where a plurality of connection setup messages are received at the destination communication terminal device, further comprising the steps of:

selecting one of received connection setup messages based on a predetermined criteria; and returning said confirmation message only for a setup message selected based on said selecting step.

8. A method according to claim 7, wherein only connection setup messages that arrive within a predetermined time span after reception of a first connection setup message at the destination communication terminal device are considered for said selecting step.

9. A method according to claim 7, wherein said predetermined criteria is based on the plurality of the network nodes traversed on said route, said route being defined by the connection setup message.

10. A method according to claim 7, wherein said predetermined criteria is based on costs incurred on said route, said route being defined by the connection setup message.

11. A method according to claim 7, wherein said predetermined criteria depends on a transmission capacity made available on said route, said route being defined by the connection setup message.

12. A method according claim 1, wherein a transmission of at least one of the connection setup message and the confirmation message between neighboring network nodes ensues via a specific connection provided exclusively for transmission of at least one of the connection setup and the confirmation message.

13. A method according to claim 12, wherein at least one channel of a connecting line between two neighboring network nodes is reserved for said specific connection.

14. A method according to claim 1, wherein an $i^{th}$ network node receiving the connection setup message enters the network node address being allocated to said $i^{th}$ network node in the communication network into an address field of an $i^{th}$ address pair field of the connection setup message.

15. A method according to claim 14, wherein the network node address is the layer-3 address of the network node according to Open Systems interconnection reference model.

16. A method according to claim 14, wherein the $i^{th}$ network node receiving the confirmation message enters a layer-2 address into a further address field of the $i^{th}$ address pair field of the confirmation message, said layer-2 address being allocated to said $i^{th}$ network node communication network according to the Open Systems interconnection reference model.

17. A method according to claim 1, wherein for a bi-directional message communication between the source communication terminal device and the destination communication terminal device the switching information being deposited sets which input of the network node is linked to which output of the network node.

18. A method according to claim 17, wherein the switching information is deleted after a predetermined time span in which no messages were transmitted between the source communication terminal device and the destination communication terminal device.

* * * * *